(12) United States Patent
Ceshkovsky (10) Patent No.: US 7,936,659 B2
(45) Date of Patent: May 3, 2011

(54) METHOD AND APPARATUS FOR MICRO OPTICAL RECORDING AND PLAYBACK TRACKING CONTROL

(75) Inventor: Ludwig Ceshkovsky, Irvine, CA (US)

(73) Assignee: Discovision Associates, Irvine, CA (US)

( * ) Notice: Subject to any disclaimer, the term of this patent is extended or adjusted under 35 U.S.C. 154(b) by 3105 days.

(21) Appl. No.: 10/190,382

(22) Filed: Jul. 3, 2002

(65) Prior Publication Data
US 2004/0004914 A1 Jan. 8, 2004

(51) Int. Cl.
*G11B 7/00* (2006.01)
(52) U.S. Cl. ........... 369/124.02; 369/112.16; 369/44.41; 369/44.26
(58) Field of Classification Search .................. None
See application file for complete search history.

(56) References Cited

U.S. PATENT DOCUMENTS

| | | | |
|---|---|---|---|
| 3,970,359 A | 7/1976 | Starkweather | |
| 4,152,586 A | 5/1979 | Elliott et al. | |
| 5,172,282 A | 12/1992 | Ghose | |
| 5,184,322 A | 2/1993 | Okun et al. | |
| 5,745,447 A * | 4/1998 | Kang | 369/44.15 |
| 5,748,600 A | 5/1998 | Sugano et al. | |
| 5,870,249 A | 2/1999 | Yanagisawa | |
| 6,693,872 B1 * | 2/2004 | Brewen et al. | 369/44.26 |

* cited by examiner

Primary Examiner — Jorge L. Ortiz (57) ABSTRACT

The present invention uses a stationary medium and a stationary optical pickup unit. The stationary optical pickup unit has a laser, which sends a beam of light through an objective lens, which focuses the beam on a point on the track of the stationary medium. The beam is then reflected toward a re-directing surface (e.g., prism) which diverts it to a photodiode array. Instead of the entire optical pickup moving to follow the track as in conventional systems, only the objective lens inside of the optical pickup moves. The position of the objective lens determines where on the information track the laser will reach. Depending upon where the laser beam reaches, the reflected light beam received by the photodetector array changes. This, in turn, affects the amount of light sensed by each photodetector in the array, thereby causing the output of each of the four photodetectors to change each time the objective lens moves. To implement the invention, the output of the photodetector array is manipulated wherein the manipulated signal corresponds to the signal that would be received if the photodetector were actually following the track directly above the laser as in prior art systems. In this manner, a signal can be used in a tracking servo that corresponds to movement within a conventional media player when actually the pickup and the medium are stationary.

53 Claims, 10 Drawing Sheets

METHOD AND APPARATUS FOR MICRO OPTICAL RECORDING AND PLAYBACK TRACKING CONTROL

BACKGROUND OF THE INVENTION

1. Field of the Invention

The present invention relates generally to media players, and more specifically to recording and playback tracking control on a media player.

2. Background of the Invention

Media players include devices commonly referred to as Compact Disc (CD) players, Digital Video Disc (DVD) players, Video Laser Disc (LD) players, and others. Media players typically operate by embedding data into a disc and/or reading the data from the disc with a laser beam. The disc usually spins and an optical pickup that houses the laser is moved in a radial direction about the spinning disc allowing the laser beam to be positioned above any area on the disc where information needs to be read from or recorded to.

It is desirable for more information to be embedded onto the disc because more information allows the user to watch a longer movie, listen to more songs, or make use of more functionality on the same type of disc. More information can be embedded into the disc by packing the information more closely together and rotating the disc faster while moving the optical pickup more precisely. This creates problems because the disc has a relatively large mass, so to spin it at a very high speed while still steadying the disc enough to be read by the laser is very difficult. Moreover, to move the pickup radially with precision is difficult as well. Before further discussing this problem, an overview of media players is provided.

Media Players

An optical media player can be either a device or system that is capable of retrieving information stored in an optically recordable medium, such as an optical disc, or a device or system that is capable of both recording information to and retrieving information from an aptically recordable medium. Examples of devices that are capable of retrieving information from an optical disc include CD players, LD players, DVD players, and compact disc read-only-memory (CD-Rom) drives. Examples of devices that are capable of both recording information to an optical disc and retrieving information from an optical disc include recordable mini-disc (MD) players, magneto-optical (MO) disc drives and compact disc recordable (CD-R) drives.

Information is generally stored by an optical disc in the form of concentric or spiral tracks sometimes referred to as information tracks. In the case where information is already stored by an optical disc, the information tracks contain regions of optical contrast that represent the stored information. In the case of an unrecorded or blank optical disc containing pre-formatted tracks for recording information, a track that will become an information track may or may not have regions of optical contrast. The area located between two information tracks on an optical disc is sometimes referred to as a non-information track.

When an optical storage device is in its normal mode of operation, (i.e. retrieving information from or recording information to an optical disc), the storage device rotates the disc while using a light beam to retrieve information from or record information to the disc. As the optical disc rotates, the light beam radially traverses the disc. While the light beam traverses the optical disc, a tracking servo loop in the optical disc storage device keeps the beam of light centered on the information track, or the track that will become the information track in the case of recording information to a disc.

Tracking Servo

An optical disc tracking servo is a closed loop system that allows a light beam to remain centered on an optical disc information track during normal operation of an optical disc storage device. The tracking servo readjusts the radial position of the light beam by sensing when the light beam drifts off the center of the information track. The tracking servo senses when the light beam is not centered on an information track by measuring the intensity of light reflected by the surface of the optical disc.

Generally, the intensity of light reflected by the surface of an optical disc is the least when it is reflected by the center of an information track. Using this principle, a tracking servo generally senses the intensity of light reflected at one or both edges of an information track to detect when a light beam is drifting off center and to determine in which direction the light beam is drifting. Therefore, a tracking servo system that is in a closed loop mode of operation senses when the light beam floats off the center of the information track by detecting changes in the intensity of light reflected at one or both edges of an information track and moves the beam back into a position where the intensity of reflected light is optimal for center tracking.

In the case where a tracking servo measures the intensity of light reflected at both edges of an information track, the intensity of reflected light that is optimal for center tracking occurs when the intensity of light reflected at both edges of an information track is the same. The same principle holds true for both one and three beam optical disc storage devices. In the case where a tracking servo measures the intensity of light reflected at one edge of an information track, the intensity of reflected light that is optimal for center tracking is based on some calibrated value. The latter method is less favored due to difficulties associated with calibrating an appropriate centering value.

High Density Mediums

As technology advances, it is desirable to store more information into the medium being recorded to or read from. One manner in which to embed more data in a medium that is comparable in size and compatible with current mediums (i.e., DVDs and CDs) is to create a track that is more tightly spiraled. In this way the disc will have more surface with which to embed the information to be used. This creates problems itself because then the radial distance between each successive track is reduced. This means the laser must be moved radially in a more precise manner. This is difficult and the tracking servo used to accomplish the precise radial movements becomes prohibitively expensive.

Moreover, it would be desirable to cause the laser to traverse the medium quicker. In this way more data can be processed by the system faster, which results in a more satisfying experience for the user. One way to accomplish this using current techniques would be to spin the disc faster. This however creates problems of its own because the inertia of the disc increases as it spins faster, which further exacerbates the problems that already exist in steadying a relatively massive disc as it spins. And to run a tracking servo with a faster spinning disc becomes exponentially more difficult.

BRIEF SUMMARY OF THE INVENTION

An object of the invention is to be able to very quickly record or follow an information track that can be much denser than is typically found in the prior art. The invention uses a stationary medium and a stationary optical pickup unit. The stationary optical pickup unit has a laser, which sends a beam of light through an objective lens. The objective lens focuses the beam on a point on the track of the stationary medium. The beam is then reflected toward a re-directing surface (e.g., a prism) which diverts it to a photodiode array. Instead of the entire optical pickup moving to follow the track as in conventional systems like CD players and DVD players, only the objective lens inside of the optical pickup moves.

The position of the objective lens determines where on the information track the laser will reach. Depending upon where the laser beam reaches, the reflected light beam received by the photodetector array changes. This, in turn, affects the amount of light sensed by each photodetector in the array, thereby causing the output of each of the photodetectors to change each time the objective lens moves.

To implement the invention, the output of the photodetector array is manipulated wherein the manipulated signal corresponds to the signal that would be received if the photodetector were actually following the track directly above the laser as in prior art systems. In this manner, a signal can be used in a tracking servo that corresponds to movement within a conventional media player when actually the pickup and the medium are stationary. This alleviates the prior art problems associated with steadying a rotating disc while trying to maximize its speed of rotation and moving an optical pickup radially while trying to fine tune the movement to work with a tightly spiraled track or a concentric track with a very close spacing between tracks, since the objective lens can be moved much more quickly, precisely, and with a near zero inertia.

In one embodiment, the invention comprises a stationary optical pickup unit, a tracking servo, a photodetector signal manipulator, and an angular position driver. The stationary optical pickup unit has a laser, which sends a beam of light through an objective lens, which focuses the beam on a point on the track of the stationary medium. The beam is then reflected toward a re-directing surface (e.g., prism) which diverts it to a photodiode array. The objective lens has three degrees of freedom, which comprise an x-axis, a y-axis, and a z-axis. The z-axis is used for focus, while the x-axis and the y-axis are used for tracking and cause the objective lens to move in a pattern to follow the track. (i.e., if the track is a spiral pattern, then the objective lens is caused to move in a spiral.)

One embodiment uses a four photodetector array. In operation, the output of the array is sent to the signal manipulator where two of the four signals pass through a first amplifier (one signal is differential with respect to the other signal) and the other two of the four signals pass through a second amplifier (again one signal is differential with respect to the other). The result is two signals that are passed through the tracking servo block where they undergo phase gain compensation, which provides for tracking servo stability. The two signals after phase gain compensation are sent to two separate amplifiers. Each of the amplifiers also receives either a sine or cosine signal that come as output from the angular position driver. The sine and cosine signals are generated by a radial ramp in conjunction with an oscillator capable of producing a regular and sinusoidal signal.

After the amplifiers each combine the sine/cosine drive signal with the signals that underwent phase gain compensation, the resulting two signals loop back to the stationary optical pickup unit. The loopback signals provide inputs to the pickup unit (for instance, at x and y lens driver coils) which cause the objective lens to move in a direction about an x and y axis and the process repeats at the next position on the media track.

It should be noted that the photodetector outputs may undergo phase gain compensation before undergoing manipulation rather than after. It should also be noted that a spiral track is used throughout this document for the purpose of example only and the present invention applies to other information track patterns as well. Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings, which are for illustrative purposes only.

DETAILED DESCRIPTION OF THE INVENTION

The present invention relates to a method and apparatus for recording and playback tracking control that is capable of functioning on a micro optical level. The term micro optical refers to the ability to record to or play from an information track that has data embedded the track that is much more closely spaced than is currently available. This is possible because the present invention utilizes an optical pickup that is capable of guiding a laser beam in a much more precise and a much faster manner than is currently possible.

Figure 1:
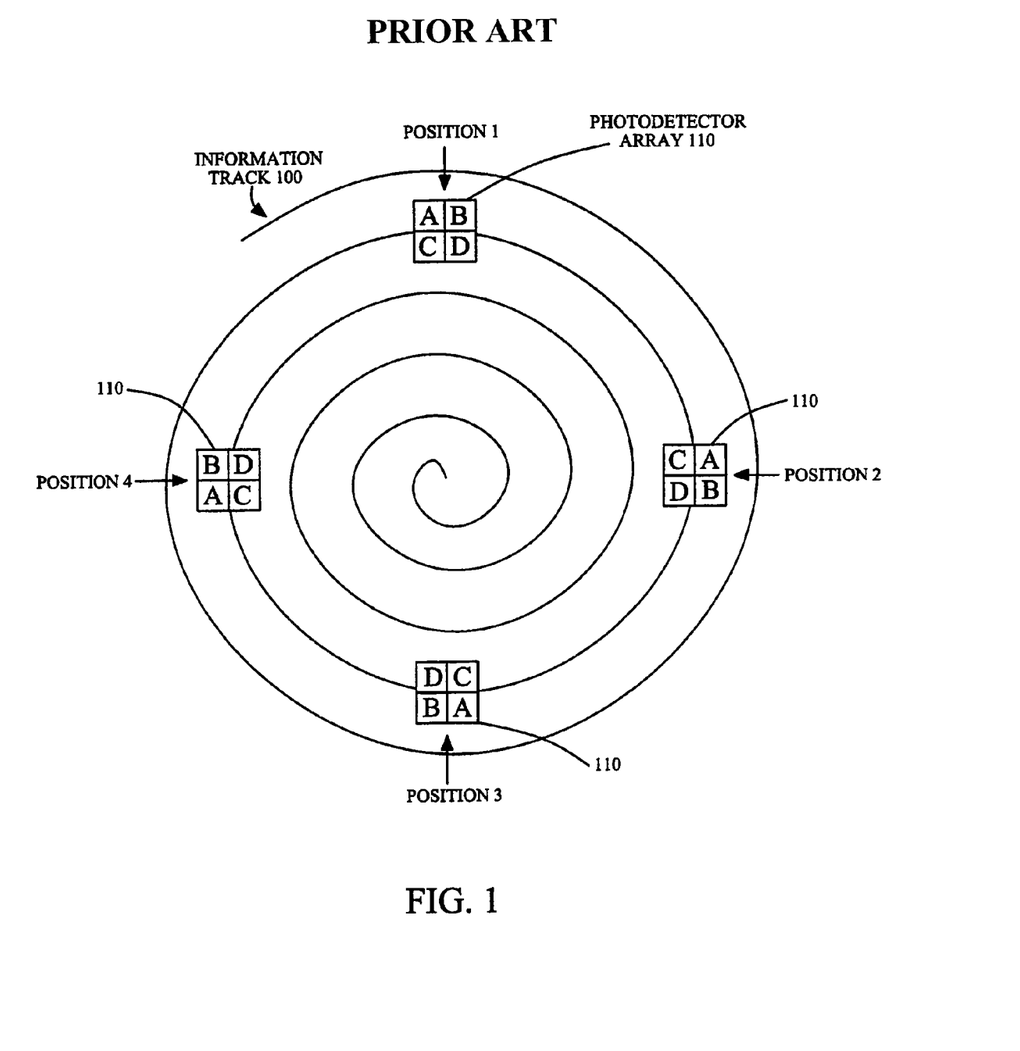
FIG. 1 is a diagram of a prior art photodetector array associated with an information track.

Referring more specifically to the drawings, FIG. 1 shows an example of a photodetector array associated with an information track that is implemented in the prior art. Information track 100 has a spiral pattern. A spiral track is used throughout this document for the purpose of example only. The present invention is equally applicable to other information track layouts as well, including concentric, substantially circular, and other patterns. Photodetector array 110 is in position 1, when it is in the 12 o'clock position. In that position photodetectors A and B are above the track 100, while photodetectors C and D are below the track 100. At position 2 (the 3 o'clock position) photodetectors A and B are right of the track while photodetectors C and D are left of the track (note that this is the case because the photodetector array 110 has undergone a ninety degree rotation between positions 1 and 2). At position 3 (the 6 o'clock position) photodetectors D and C are above the track, while photodetectors B and A are below the track. At position 4 (the 9 o'clock position) photodetectors D and C are right of the track, while photodetectors B and A are left of the track.

FIG. 1 is used to illustrate the point that as the photodetector array moves about the track, the position of the photodetectors changes, and hence the signals they receive changes. A prior art tracking servo may be implemented by rotating a photodetector array about a track as shown in FIG. 1.

Micro Optical Tracking Control

Figure 2:
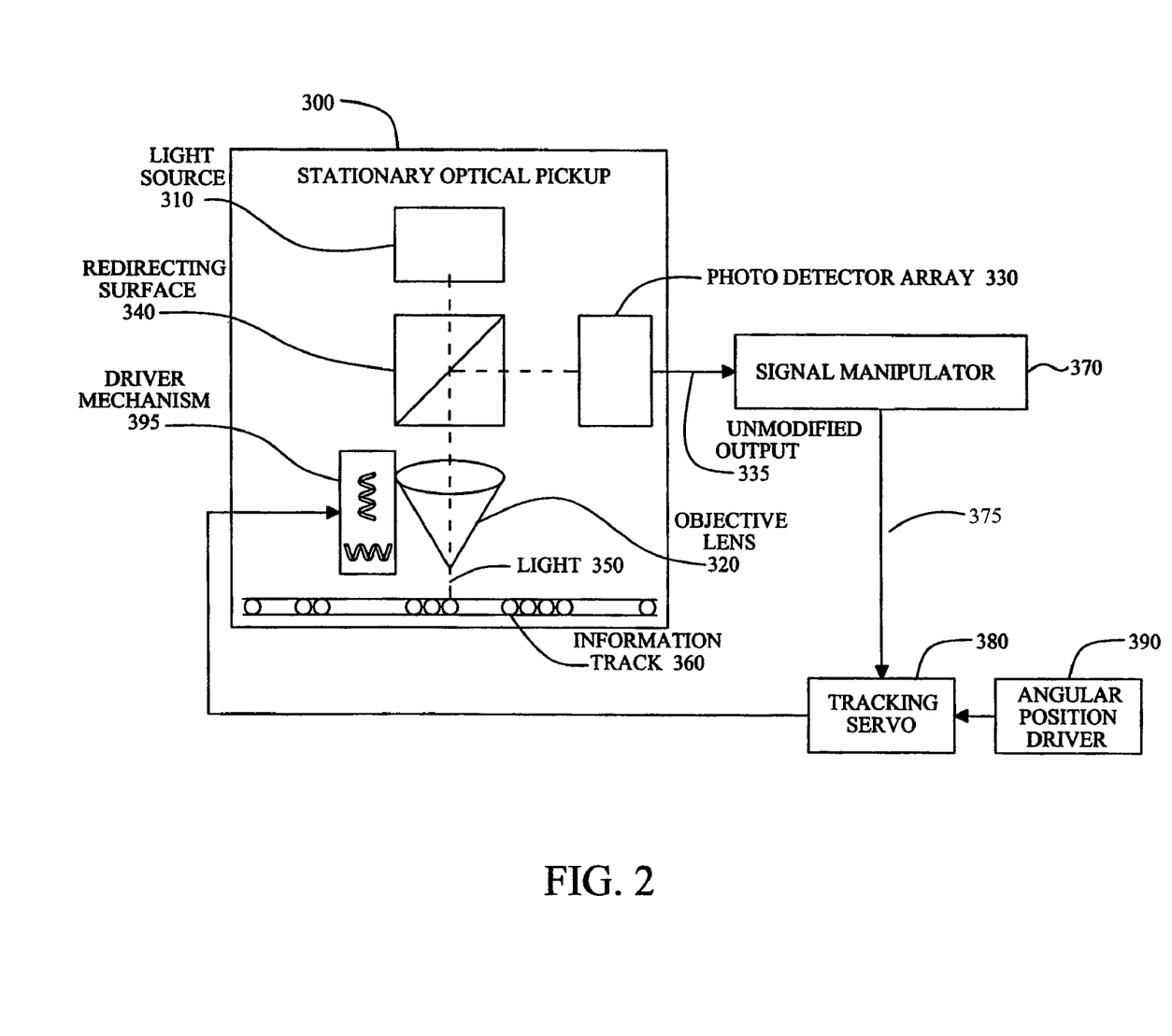
FIG. 2 is a functional diagram of a micro optical tracking control device according to an embodiment of the present invention.

Unlike FIG. 1, the photodetector array remains stationary according to the present invention and the outputs of the photodetectors are manipulated to achieve equivalent signals to those illustrated in FIG. 1. FIG. 2 is a functional block diagram of a micro optical tracking apparatus in accordance with the present invention. The micro optical apparatus includes a stationary optical pickup 300. Stationary optical pickup 300 comprises a light source 310 (e.g., a laser), an objective lens 320, a photodetector array 330, and a redirecting surface 340 (e.g., a prism). Light 350 is transmitted via light source 310 and it passes through redirecting surface 340, then through objective lens 320, before contacting an information track 360.

Information track 360 reflects the light through redirecting surface 340 where it is guided to photodetector array 330. Depending on where the laser contacted information track 360 determines the initial unmodified output 335 of photodetectors 330. This initial unmodified output changes in a regular sinusoidal fashion similar to that shown in FIG. 1. This unmodified output is capable of being manipulated by the present invention to simulate the same results as shown in FIG. 1. To accomplish this task, the unmodified outputs of the photodetectors provide input to signal manipulator 370 where they are transformed to signals equivalent to those shown in FIG. 1.

Next, the manipulated signals are sent to a tracking servo 380. Tracking servo 380 applies phase gain compensation and those signals are combined with a generated sine and cosine signal from an angular position driver 390. Angular position driver 390 is used to modify the signals in such a manner that when they loop back to stationary optical pickup 300, driver mechanisms 395 (such as x and y lens driver coils) in the pickup receive input that cause them to move the objective lens about an x and y axis, so that it is in position to guide the laser to the next location on the track and the process repeats.

Photodetector Signal Manipulator

The purpose of the photodetector signal manipulator 370 is to modify the output of the photodetector array 330 wherein the manipulated output 375 corresponds to the signal that occurs when the pickup follows the track. In this manner, a signal can be used in a tracking servo that corresponds to movement within a conventional media player when actually the pickup and the medium are stationary. This alleviates the prior art problems associated with steadying a rotating disc while trying to maximize its speed of rotation and moving an optical pickup radially while trying to fine tune the movement to work with a tightly spiraled track, or other dense track such as a concentric track having multiple tracks that are substantially circular with very small spacings between the tracks.

Figure 3:
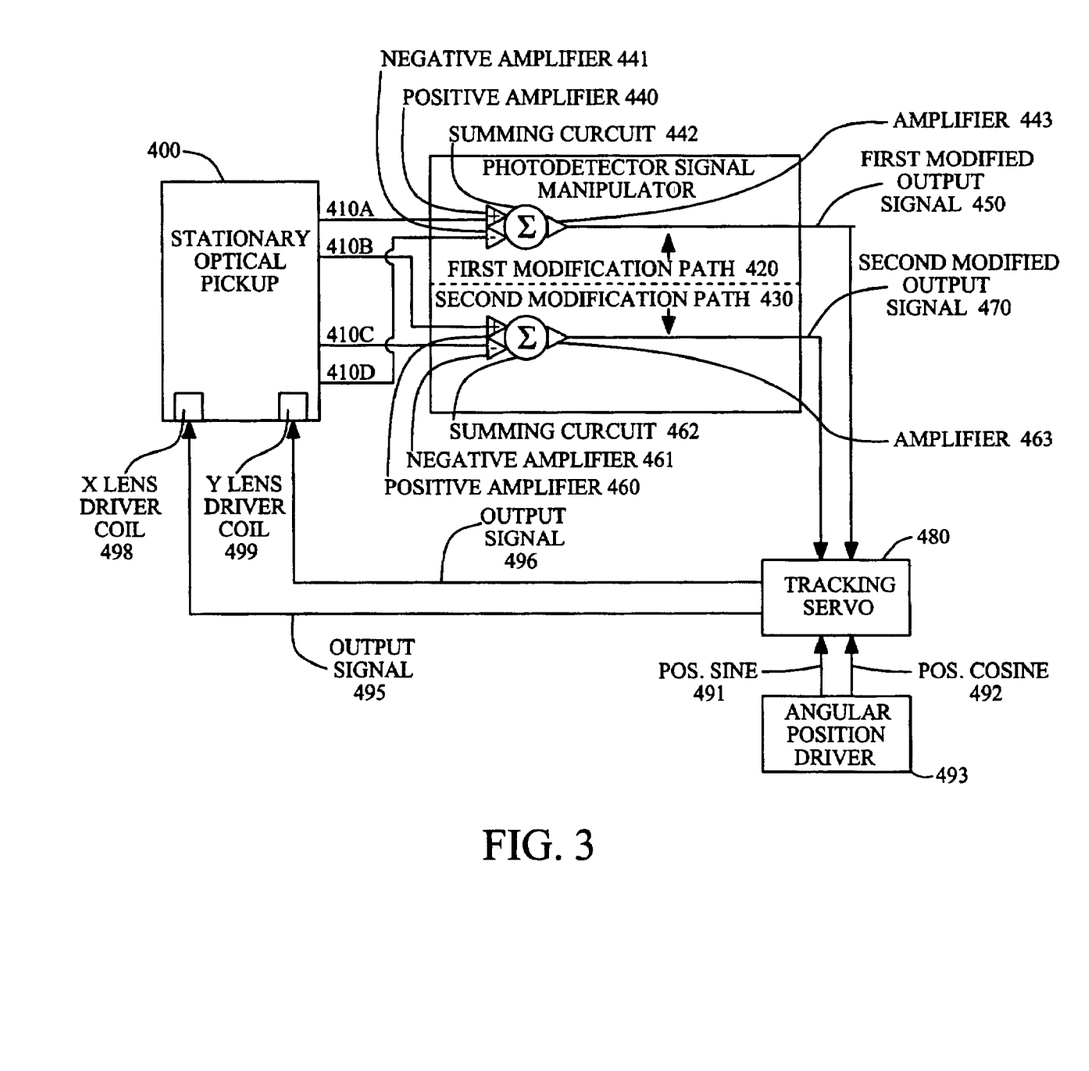
FIG. 3 is a functional diagram showing a photodetector signal manipulator according to an embodiment of the present invention.

FIG. 3 is a functional diagram showing the photodetector signal manipulator according to an embodiment of the present invention. A stationary optical pickup 400 provides four unmodified photodetector output signals labeled 410*a*, 410*b*, 410*c*, and 410*d*. It should be noted that any number of photodetectors may be used with the present invention. The unmodified outputs 410*a-d* are obtained by a light source in pickup 400 directing a laser onto an information track and having the reflection of the laser diverted into the photodetectors. The photodetectors sense the strength of the reflection of this light and the unmodified outputs 410*a-d* are values representing the strength of these reflections.

The signals 410*a* and 410*d* are combined in a first modification path 420 in photodetector signal manipulator 401, while signals 410*b* and 410*c* are combined in a second modification path 430. In the first modification path 420, signal 410*a* is passed to a positive amplifier 440 while signal 410*d* is passed to a negative amplifier 441. The two signals then are passed to a summing circuit 442 and passed through another amplifier 443. This results in a first modified output signal 450.

The signals 410*b* and 410*c* are combined in a second modification path 430. In the second modification path 430, signal 410*b* is passed to a positive amplifier 460 while signal 410*c* is passed to a negative amplifier 461. The two signals then are passed to a summing circuit 462 and passed through another amplifier 463. This results in a second modified output signal 470.

The first and second modified output signals 450 and 470 are passed through a tracking servo 480 and are combined with POSsine and POScosine signals 491 and 492 from the angular position driver 493 to produce output signals 495 and 496 before looping back to pickup 400 at x and y lens driver coils 498 and 499.

Angular Position Driver

The purpose of the angular position driver is to modify the tracking signals in such a way that the position of the objective lens in the pickup can be changed so that it will direct the laser to inscribe a track at a rate required to recover recorded information. For example, in the case where the track is a spiral, the angular position driver continually modifies the tracking signal so that the spiral shape of the information track is accounted for.

Figure 4:
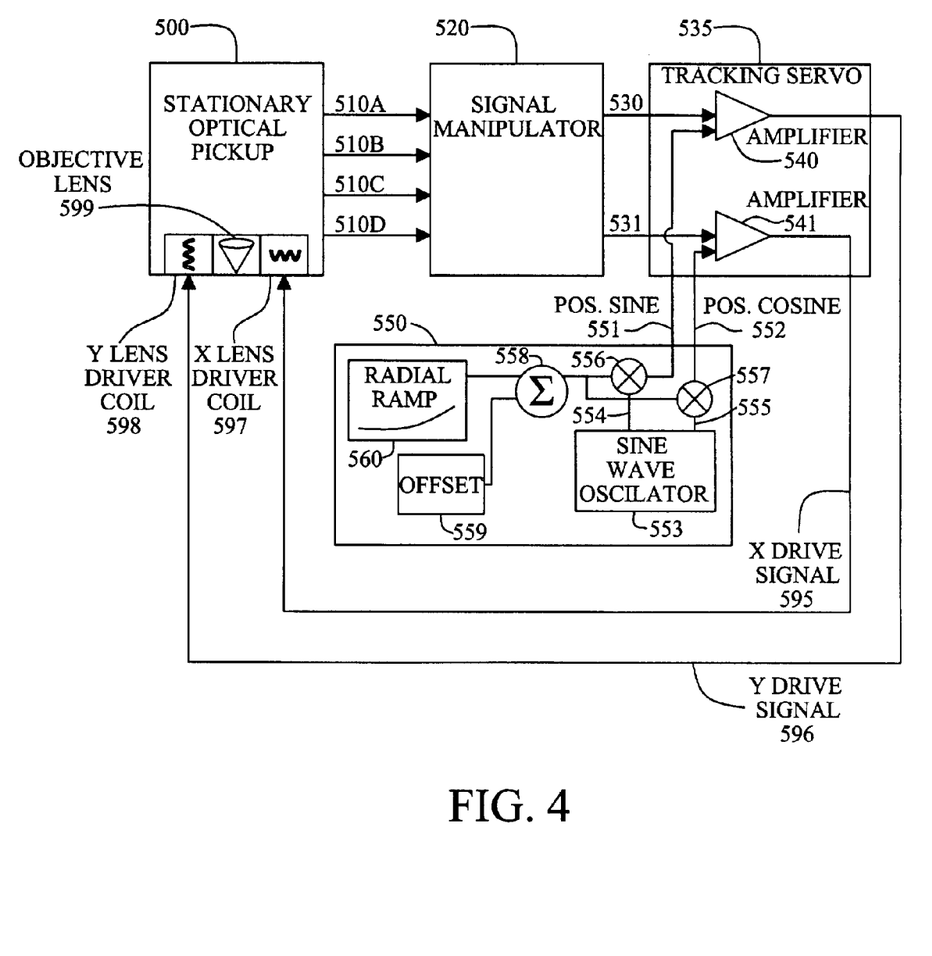
FIG. 4 is a functional diagram showing the angular position driver according to an embodiment of the present invention.

FIG. 4 is a diagram showing the angular position driver according to an embodiment of the present invention. Block 500 is the stationary optical pickup. For the purpose of this embodiment, block 500 provides four unmodified photodetector output signals labeled 510*a*, 510*b*, 510*c*, and 510*d*. The signals 510*a* through 510*d* are sent to a signal manipulator 520, such as that described in FIG. 3. The outputs of signal manipulator 520 are first and second modified signals 530 and 531, which are passed to tracking servo block 535. Amplifiers 540 and 541 receive first and second modified signals 530 and 531 as well as generated POSsine and POScosine signals 551 and 552 from angular position driver 550.

Angular position driver 550 in this embodiment includes a radial ramp 560 that sends a ramp signal to a summing circuit 558 which is combined with an offset 559. The offset 559 is used to start the spiral and corresponds to the inner radius of the spiral information track. A sine wave oscillator 553 generates sine signal 554 and cosine signal 555. A first multiplier 556 receives sine signal 554 and combines it with the output of the summing circuit 558. A second multiplier 557 receives cosine signal 555 and also combines it with the output of the summing circuit 558. The result is the generated POSsine and POScosine signals 551 and 552 respectively.

It should be noted that the above embodiment of the angular position driver applies to a spiral track. In the case of a track with concentric circles, the angular position driver might simply be an oscillator capable of producing a regular and sinusoidal signal. The output of amplifiers 540 and 541 are x and y drive signals 595 and 596 respectively, which loop back to pickup 500 and connect to x and y lens driver coils 597 and 598 that are configured to move objective lens 599 to the appropriate next position.

Embodiment of a Stationary Optical Pickup

The stationary optical pickup according to the present invention has an objective lens that has three degrees of freedom. The lens moves in the x and y directions to track the information found on the medium it is shining the laser upon. It also moves in the z direction for focus. Unlike conventional pickups, however, the entire pickup unit itself does not move for tracking and focus. Instead, the entire pickup is only moved incrementally in the x, y, or z direction to follow another spiral information track.

Figure 5:
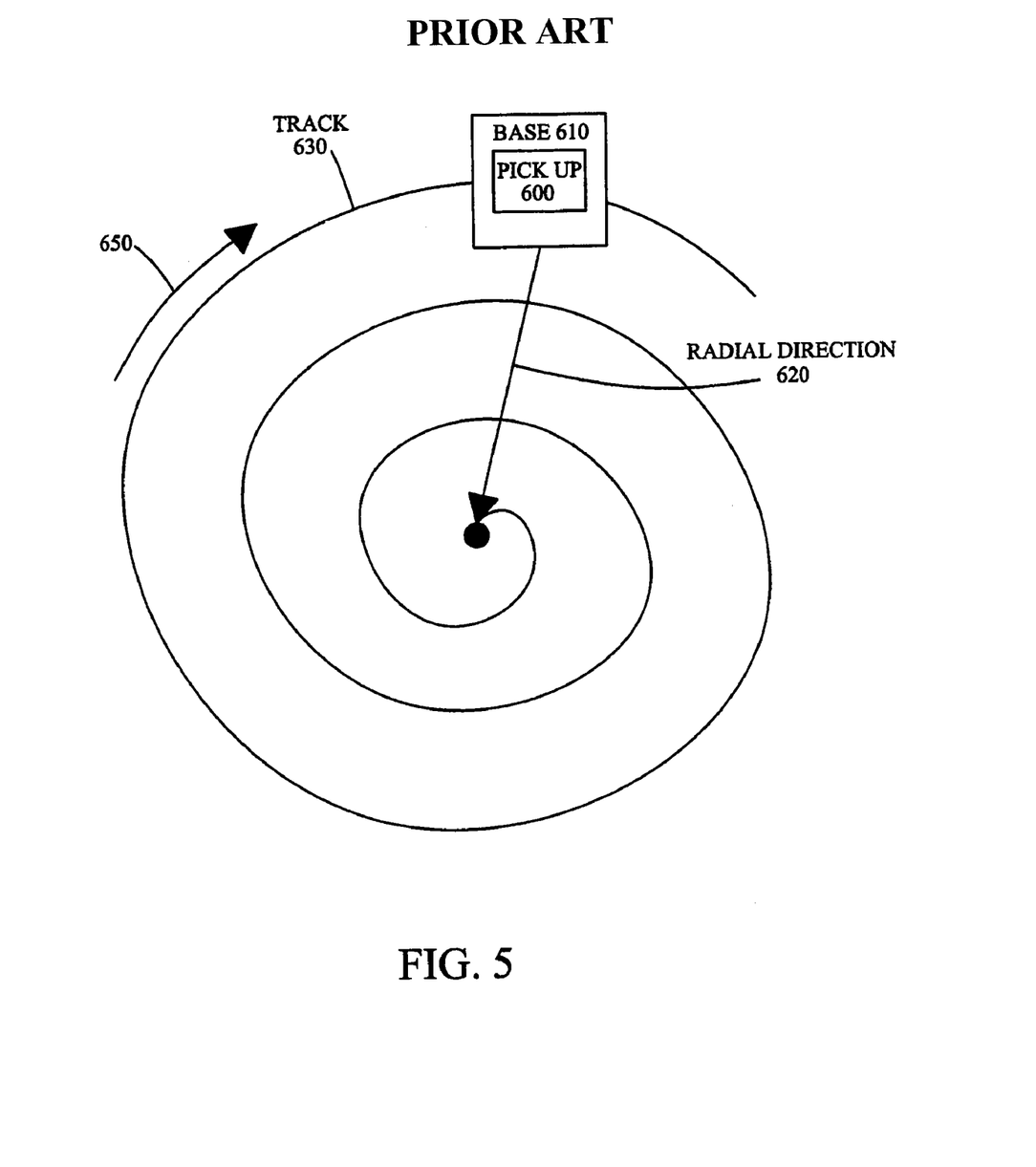
FIG. 5 is a diagram of a prior art optical pickup unit.

An example of a prior art pickup moved for tracking and focus is shown in FIG. 5. The entire base 610 of the pickup 600 is moved in a radial direction 620 with respect to track 630. In addition, track 630 rotates in direction 650, so by a combination of rotation in direction 650 and movement by pickup 600 in radial direction 620 the entire information track is covered.

Figure 6:
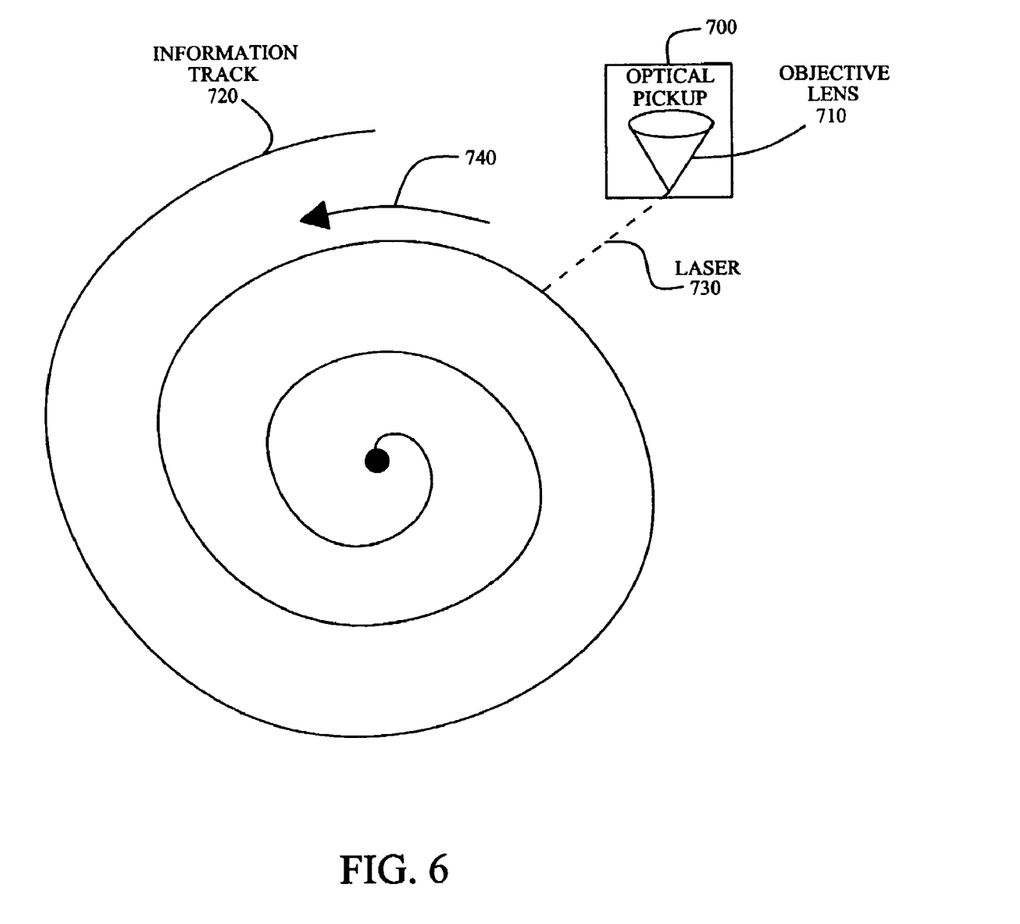
FIG. 6 shows an arrangement of a stationary optical pickup unit and a stationary disc according to an embodiment of the present invention.

In the present invention, the pickup does not move at all when it follows a single information track, nor does the information track. This arrangement is shown in FIG. 6. Stationary optical pickup 700 has an objective lens 710 that moves with three degrees of freedom. Information track 720 is stationary as well. Laser 730 is configured to move in the direction of arrow 740 solely by the movement of objective lens 710 so that it can cover the entire information track.

Figure 7:
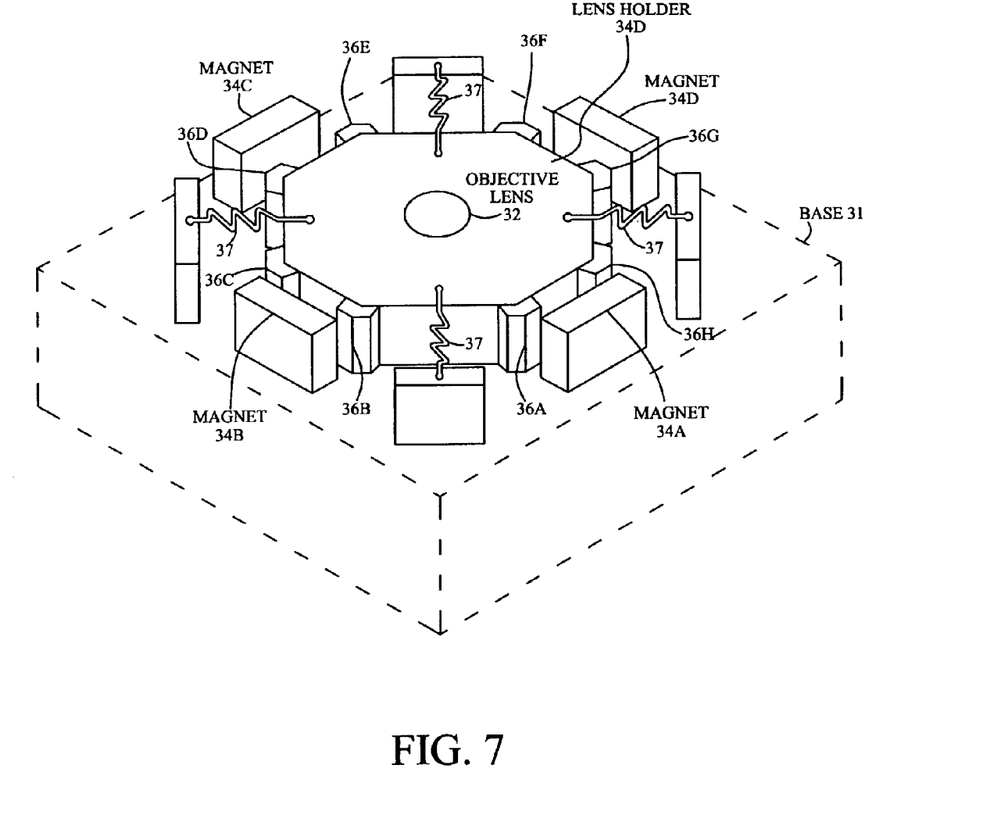
FIG. 7 is a schematic perspective view of an optical pickup unit having three degrees of freedom according to an embodiment of the present invention.

The present invention is designed to work with any optical pickup apparatus that has three degrees of freedom. Such an apparatus is well known to those skilled in the art. For illustration, one embodiment of an optical pickup having three degrees of freedom is described below in connection with FIG. 7. As shown in FIG. 7, a three-axis actuator for an optical pickup has a base 31. A lens holder 33 having an objective lens 32 is mounted on the base 31. Magnets 34A, 34B, 34C, and 34D are installed at the base 31 around the lens holder 33. A focus coil 35 is wound around the lens holder 33. A plurality of tracking coils 36A-36H are attached to the focus coil 35, and a plurality of suspension members 37 for supporting the lens holder 33 such that the lens holder 33 is movable above the base 31.

The lens holder 33 is moved along the X and Y-axes by the interaction between the magnets 34A-34D and a current flowing through the tracking coils 36A-36H. That is, each of the one portions of the first tracking coils 36A and 36B and third tracking coils 36E and 36F face the first and third magnets 34A and 34C, respectively, and move the lens holder 33 in the X-axis direction. Each of the one portions of the second tracking coils 36C and 36D and fourth tracking coils 36G and 36G face the second and fourth magnets 34B and 34D, respectively, and move the lens holder 33 in the Y-axis direction.

For example, currents flow in the same direction through the respective portions of the first tracking coils 36A and 36B, which face the first magnet 34A. If a current is applied counterclockwise to the tracking coil 36A, the current flows downward through the portion of the tracking coil 36A, which faces the first magnet 34A, i.e., the left portion. Here, the current is applied clockwise to the tracking coil 36B and thus the current flows downward through the portion of the tracking coil 36B, which faces the first magnet 34A, i.e., the right portion.

The current is applied to the second, third, and fourth tracking coils 36C and 36D, 36E and 36F, and 36G and 36H in the same manner as to the first tracking coils 36A and 36b. Therefore, since the directions of currents flowing through coil portions facing the magnets 34A-34D are identical, force is applied to the lens holder 33 in one direction. Each of the suspension members 37 is formed of elastic material so as to serve as an elastically biasing member, which is capable of stretching. One end of each suspension member 37 is fixed to the lens holder 33 and the other end thereof is fixed to support members installed on the base 31. The focus coil is wound around the lens holder 33. Accordingly, the objective lens 32 is moved upward and downward along a focusing direction (i.e., along a Z-axis) by the interaction between a current applied to the focus coil 35 and the magnets 34A-34D. The above three-axis moving actuator for an optical pickup moves the objective lens in the tangential direction of a disc track as well as in the tracking and focusing directions. Accordingly, focusing, tracking, and errors of the tangential direction can be corrected, which enables the actuator to be widely used as an optical pickup for high-density discs.

Figure 8:
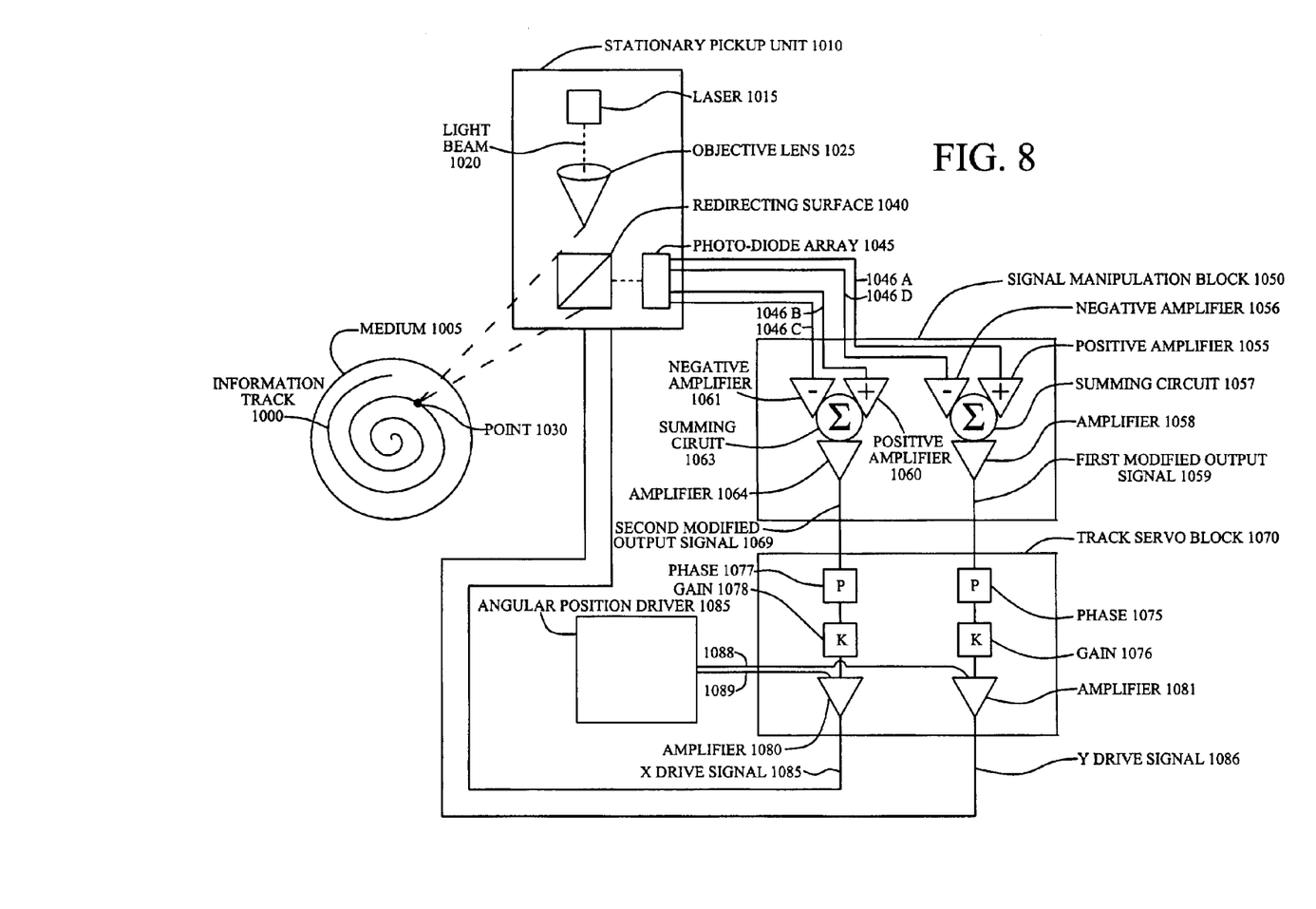
FIG. 8 is a functional diagram of a micro optical recording and playback tracking control apparatus according to an embodiment of the present invention.

Embodiment of a Micro Optical Recording and Playback Tracking Control Apparatus One embodiment of a micro optical recording and playback tracking control apparatus is shown in FIG. 8. The apparatus is used to read information track 1000 of medium 1005. To this end, stationary pickup unit 1010 has a laser 1015, which sends a beam of light 1020 through an objective lens 1025, which focuses the beam on a point 1030 on the track of the stationary medium 1005. The beam is then reflected toward a re-directing surface 1040 (e.g., prism) which diverts it to a photodiode array 1045.

The output of the photodiode array 1045 comprises unmodified photodetector output signals 1046a through 1046d, which are sent to a signal manipulation block 1050. Signals 1046a and 1046d are sent to a first modification path, while signals 1046d and 1046c are sent to a second modification path. In the first modification path, signal 1046a is passed to a positive amplifier 1055 while signal 1046d is passed to a negative amplifier 1056. The two signals then are passed to a summing circuit 1057 and passed through another amplifier 1058. This results in a first modified output signal 1059.

The signals 1046b and 1046c are sent to a second modification path. In the second modification path, signal 1046b is passed to a positive amplifier 1060 while signal 1046c is passed to a negative amplifier 1061. The two signals then are passed to a summing circuit 1063 and passed through another amplifier 1064. This results in a second modified output signal 1069.

The first and second modified output signals 1059 and 1069 are passed to a tracking servo 1070. In the tracking servo signal 1059 undergoes a phase gain compensation process known to those skilled in the art by passing through phase 1075 and then through gain 1076. Likewise, signal 1069 passes through phase 1077 and through gain 1078. The results are passed to first and second amplifiers 1080 and 1081. In the angular position driver 1085 a POSsine and a POScosine signal 1088 and 1089 that are sent to amplifiers 1080 and 1081 respectively that received the signals that underwent phase gain compensation. Angular position driver outputs the POSsine signal 1088 and the POScosine signal 1089 in any manner known to those skilled in the art. For instance it can use a sine generator to produce the POSsine signal 1088 and it can use the same sine generator coupled with a phase shifter to output the POScosine signal 1089.

The output of amplifiers 1080 and 1081 result in x and y driver signals 1085 and 1086, which loop back to pickup unit 1010 and provide input to the unit so that the objective lens 1025 can be moved to the next appropriate position, wherein the laser is guided to the next position on the information track. The movement of the lens is achieved in any manner well known to those skilled in the art. For instance, it may be accomplished by connecting x and y lens driver coils in the pickup 1010 to move the lens, or in the manner described in connection with FIG. 3.

Alternate Media Types

Figure 9:
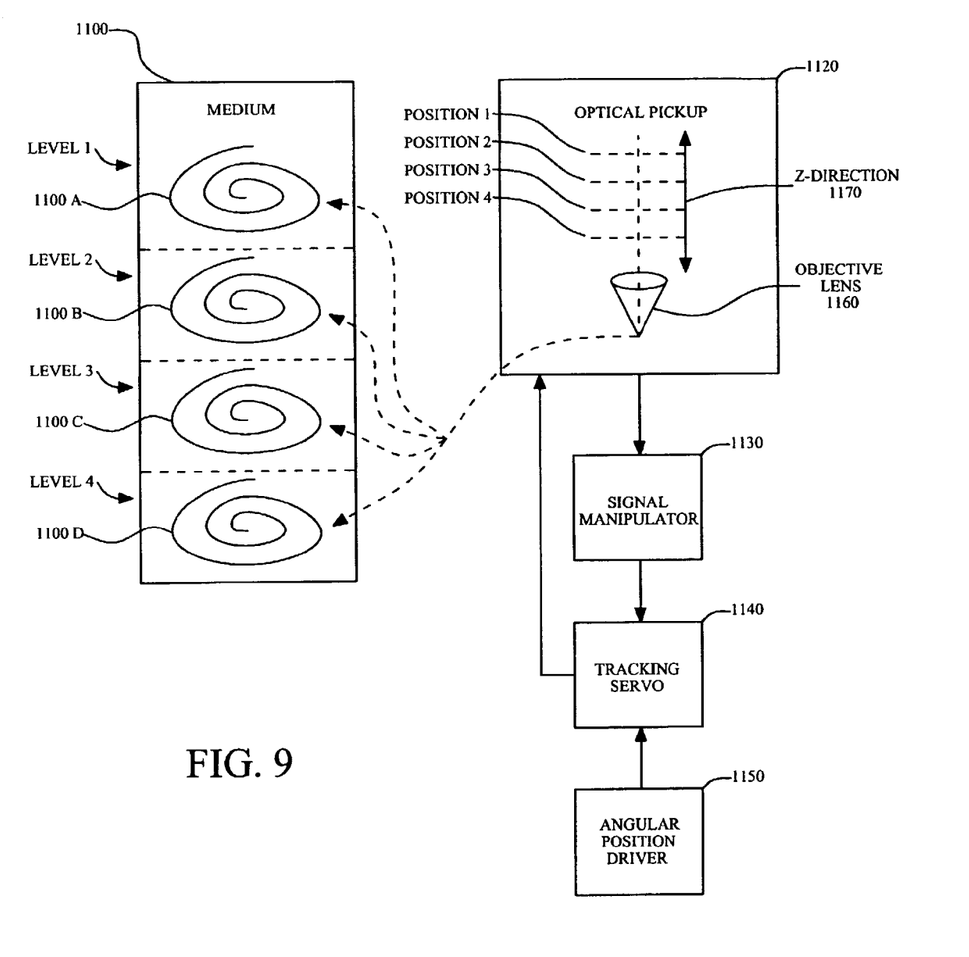
FIG. 9 is a functional diagram showing how an embodiment of the present invention operates upon a three dimensional medium.

The present invention works well with any suitable medium including three-dimensional mediums like holographs and two dimensional mediums having multiple information tracks in the x and y directions. FIG. 9 provides an example of how an embodiment of the present invention can be adapted to operate upon a three dimensional medium. Medium 1100 includes multiple information tracks 1110*a* through 1110*d*. Each information track 1110 is at a different level. Track 1110*a* is at level 1. Track 1110*b* is at level 2. Track 1110*c* is at level 3. Track 1110*d* is at level 4. The player according to the present invention includes the stationary optical pickup 1120, the signal manipulator 1130, the tracking servo 1140, and the angular position drive block 1150.

Within the optical pickup 1120, an objective lens 1160 has three degrees of freedom. The z direction 1170 corresponds to a vertical direction, wherein the objective lens may be focused in the z direction to any particular information track, but it can also be cause to move to a different level. For instance, position 1 of the lens 1160 causes the lens to focus on level 1110*a*. Position 2 of the lens 1160 causes the lens to focus on level 1110*b*. Position 3 of the lens 1160 causes the lens to focus on level 1110*c*. Position 4 of the lens 1160 causes the lens to focus on level 1110*d*.

Figure 10:
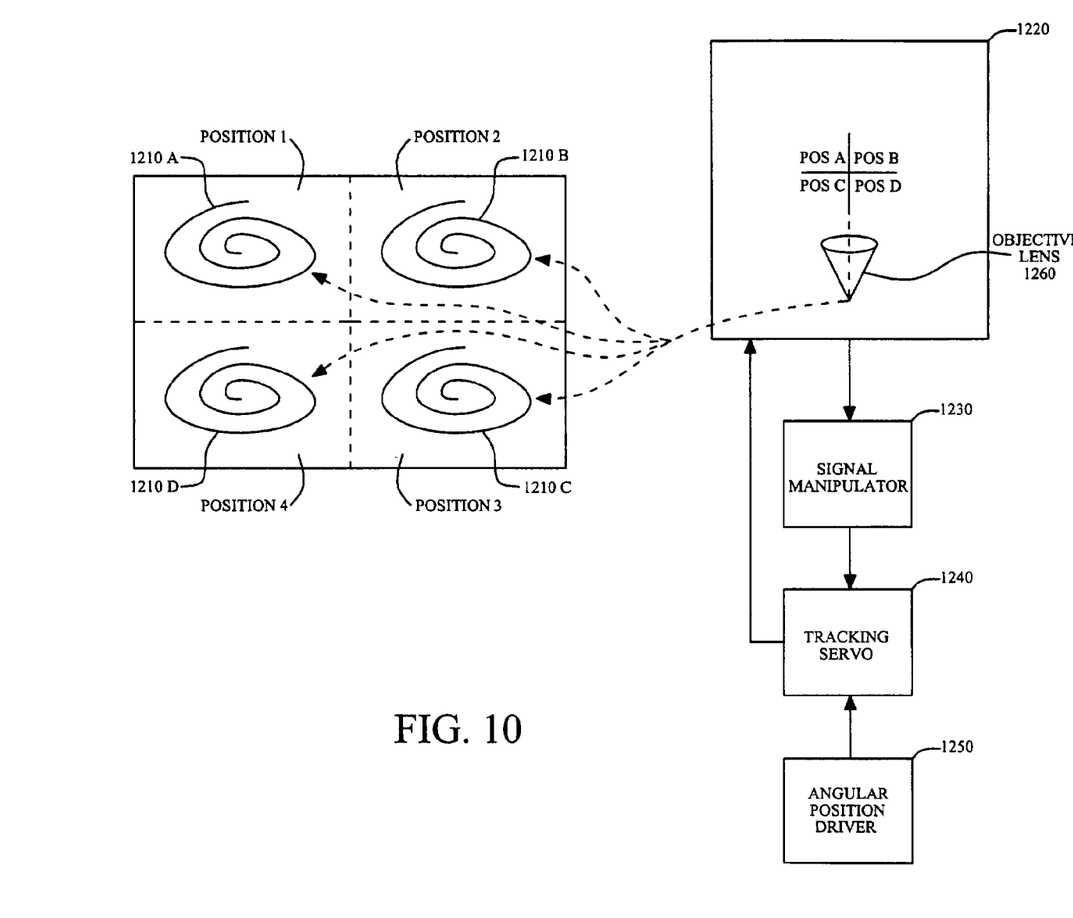
FIG. 10 is a functional diagram showing how an embodiment of the present invention operates upon a medium having multiple information tracks.

FIG. 10 provides an example of how an embodiment of the present invention can be adapted to operate upon a medium having multiple information tracks in the x and y directions. Medium 1200 includes multiple information tracks 1210*a* through 1210*d*. Each information track 1210 is at a different position with respect to an x, y grid. Track 1210*a* is at position 1. Track 1210*b* is at position 2. Track 1210*c* is at position 3. Track 1210*d* is at position 4. The player according to the present invention includes the stationary optical pickup 1220, the signal manipulator 1230, the tracking servo 1240, and the angular position drive block 1250.

Within the optical pickup 1220, an objective lens 1260 has three degrees of freedom. The objective lens may be moved in the x and y directions to any particular information track. For instance, position 1 of the lens 1260 causes the lens to read track 1210*a*. Position 2 of the lens 1260 causes the lens to read track 1210*b*. Position 3 of the lens 1260 causes the lens to read track 1210*c*. Position 4 of the lens 1260 causes the lens to read track 1210*d*

The operation of the present invention is the same as that described in various embodiments of the present invention, except the lens operates on each level in this manner. Although the description above contains many specificities, these should not be construed as limiting the scope of the invention but as merely providing illustrations of some of the presently preferred embodiments of this invention. Thus the scope of this invention should be determined by the appended claims and their legal equivalents.

What is claimed is:

1. An apparatus comprising:
a medium having an information track;
an optical pickup, which is stationary relative to the medium;
an objective lens in said optical pickup, which is arranged to direct a beam to the information track;
first and second lens driver coils, which are configured to move said objective lens in first and second degrees of freedom;
a plurality of optical sensors in said optical pickup unit and arranged to receive a reflection of said beam from said medium, each optical sensor having one or more outputs; and
a signal manipulator, which receives the outputs from said plurality of optical sensors and combines the outputs to produce combined outputs that together simulate a rotation of said optical pickup unit relative to said medium.

2. The apparatus of claim 1 wherein said optical pickup unit comprises:
a light source;
and a surface;
wherein the beam is directed from said light source, through said objective lens, onto the information track of the medium, and said surface which directs the reflection of said beam to said plurality of optical sensors.

3. The apparatus of claim 1 wherein said medium is an optically recordable medium.

4. The apparatus of claim 1 wherein said medium is a three dimensional medium.

5. The apparatus of claim 4 wherein said three dimensional medium is a holographic medium.

6. An apparatus comprising:
an optical pickup unit having an array of photodetectors, wherein the optical pickup unit is arranged to direct a beam to an information track on a medium and the array of photodetectors is arranged to receive a reflection of said beam from said medium;
a photodetector signal manipulator;
a tracking servo; and
an angular position driver, wherein one or more outputs of said array is altered by said photodetector signal manipulator, said tracking servo, and said angular position driver to produce at least a first and a second drive signal that provide input to said optical pickup unit and simulate a rotation of said optical pickup unit, wherein the alteration of said outputs of said array of photodetectors further comprises the photodetectors signal manipulator receiving a first, a second, a third, and a fourth output, sending the first and fourth outputs through a first modification path and sending the second and third outputs through a second modification path.

7. The apparatus of claim 6 wherein said first modification path further comprises:
a first positive amplifier configured to receive said first output;
a first negative amplifier configured to receive said fourth output;
a first summing circuit configured to sum said first and fourth outputs; and
a first additional amplifier to receive an output of said first summing circuit and to output a first modified output signal.

8. The apparatus of claim 7 wherein said second modification path further comprises:
a second positive amplifier configured to receive said second output; a second negative amplifier configured to receive said third output;
a second summing circuit configured to sum said second and third outputs; and
a second additional amplifier to receive an output of said second summing circuit and to output a second modified output signal.

9. The apparatus of claim 8 wherein the alteration of said outputs of said array of photodetectors further comprises said tracking servo receiving said first and second modified output signals and performing a phase gain compensation process on said first and second modified output signals.

10. The apparatus of claim 9 wherein the alteration of said outputs of said array of photodetectors further comprises said angular position driver producing a POSsine and a POScosine signal wherein said first modified output signal is combined with said POSsine signal in a third amplifier to produce said first drive signal and said second modified output signal is combined with said POScosine signal in a fourth amplifier to produce said second drive signal.

11. The apparatus of claim 10 wherein said POSsine and said POScosine signals are generated by a radial ramp.

12. The apparatus of claim 10 wherein said POSsine and said POScosine signals are generated by an oscillator.

13. The apparatus of claim 11 wherein said optical pickup unit comprises an objective lens having a first, a second, and a third degree of freedom wherein said first and second degrees of freedom are controlled by first and second lens driver coils.

14. The apparatus of claim 13 wherein said first drive signal provides input to said first lens driver coil and said second drive signal provides input to said second lens driver coil.

15. The apparatus of claim 6 wherein said medium is an optically recordable medium.

16. The apparatus of claim 6 wherein said medium is a three dimensional medium.

17. The apparatus of claim 16 wherein said three dimensional medium is a holographic medium.

18. A method for recording and playback tracking control comprising:
   generating a beam from a light source in an optical pickup unit, which is stationary relative to a medium comprising an information track;
   passing said beam through an objective lens of the optical pickup unit, wherein the objective lens has a first, a second, and a third degree of freedom and directs said beam to a point on the information track of the medium;
   sensing a reflection of said beam with a plurality of optical sensors in said optical pickup unit, each having one or more outputs; and
   manipulating said outputs to simulate a rotation of said optical pickup unit relative to said medium.

19. The method of claim 18 wherein said sensing further comprises:
   redirecting the reflection of said beam with a redirecting surface toward said plurality of optical sensors.

20. The method of claim 18 wherein said medium is an optically recordable medium.

21. The method of claim 18 wherein said medium is a three dimensional medium.

22. The method of claim 21 wherein said three dimensional medium is a holographic medium.

23. A method comprising:
   directing a beam through an objective lens of an optical pickup unit to an information track on a medium, wherein the optical pickup unit is stationary relative to the medium and the objective lens is movable in first and second degrees of freedom;
   receiving a reflection of said beam with an array of photodetectors in said optical pickup unit; altering one or more outputs of said array of photodetectors with a photodetector signal manipulator;
   altering one or more outputs of said array of photodetectors with a tracking servo;
   altering one or more outputs of said array of photodetectors with an angular position driver; and
   producing at least a first and a second drive signal that provide input to said optical pickup unit and simulate a rotation of said optical pickup unit relative to said medium.

24. The method of claim 23 wherein said altering said outputs of said array of photodetectors further comprises:
   receiving a first, a second, a third, and a fourth output in said photodetector signal manipulator;
   sending said first and fourth outputs through a first modification path; and
   sending said second and said third outputs are sent through a second modification path.

25. The method of claim 24 wherein said sending said first and fourth outputs through a first modification path further comprises:
   receiving said first output with a first positive amplifier;
   receiving said fourth output with a first negative amplifier;
   summing said first and fourth outputs with a first summing circuit;
   receiving an output of said first summing circuit with a first additional amplifier; and
   outputting a first modified output signal with said first additional amplifier.

26. The method of claim 25 wherein said sending said second and third outputs through a second modification path further comprises:
   receiving said second output with a second positive amplifier;
   receiving said third output with a second negative amplifier;
   summing said second and third outputs with a second summing circuit; receiving an output of said second summing circuit with a second additional amplifier; and
   outputting a second modified output signal with said second additional amplifier.

27. The method of claim 26 wherein said altering one or more outputs of said array of photodetectors with a tracking servo further comprises:
   receiving said first and second modified output signals with said tracking servo; and
   performing a phase gain compensation process on said first and second modified output signals.

28. The method of claim 27 wherein said altering one or more outputs of said array of photodetectors with an angular position driver further comprises:
   producing a POSsine and a POScosine signal with said angular position driver;
   combining said first modified output signal with said POSsine signal in a third amplifier to produce said first drive signal; and
   combining said second modified output signal with said POScosine signal in a fourth amplifier to produce said second drive signal.

29. The method of claim 28 wherein said POSsine and said POScosine signals are generated by a radial ramp.

30. The method of claim 28 wherein said POSsine and said POScosine signals are generated by an oscillator.

31. The method of claim 29 wherein said optical pickup unit comprises an objective lens having a first, a second, and a third degree of freedom, further comprising controlling said first and second degrees of freedom with first and second lens driver coils.

32. The method of claim 31, further comprising: providing input to said first lens driver coil with said first drive signal; and providing input to said second lens driver coil with said second drive signal.

33. The method of claim 23 wherein said medium is an optically recordable medium.

34. The method of claim 23 wherein said medium is a three dimensional medium.

35. The method of claim 34 wherein said three dimensional medium is a holographic medium.

36. A system comprising:
   means for generating a beam from a light source in an optical pickup unit, which is stationary relative to a medium comprising an information track;
   means in the optical pickup for directing the beam to a point on the information track of the medium, the means for directing having a first, a second, and third degree of freedom;
   means for sensing a reflection of said beam with a plurality of optical sensors in said optical pickup unit, each having one or more outputs; and
   means for manipulating said outputs to simulate a rotation of said optical pickup unit relative to said medium.

37. The system of claim 36 wherein:
   said means for directing further comprises an objective lens having the first, second, and third degrees of freedom; and
   said means for sensing comprises means for redirecting the reflection of said beam with a redirecting surface toward said plurality of optical sensors.

38. The system of claim 36 wherein said medium is an optically recordable medium.

39. The system of claim 36 wherein said medium is a three dimensional medium.

40. The system of claim 39 wherein said three dimensional medium is a holographic medium.

41. A system comprising:
   means for directing a beam through an objective lens of an optical pickup unit to an information track on a medium, wherein the optical pickup unit is stationary relative to the medium and the objective lens is movable in first and second degrees of freedom;
   means for receiving a reflection of said beam with an array of photodetectors in said optical pickup unit;
   means for altering one or more outputs of said array of photodetectors with a photodetector signal manipulator;
   means for altering one or more outputs of said array of photodetectors with a tracking servo;
   means for altering one or more outputs of said array of photodetectors with an angular position driver; and
   means for producing at least a first and a second drive signal that provide input to said optical pickup unit and simulate a rotation of said optical pickup unit relative to said medium.

42. The system of claim 41 wherein said means for altering said one or more outputs of said array of photodetectors further comprises:
   means for receiving a first, a second, a third, and a fourth output in said photodetector signal manipulator;
   means for sending said first and fourth outputs through a first modification path; and
   means for sending said second and said third outputs are sent through a second modification path.

43. The system of claim 42 wherein said means for sending said first and fourth outputs through a first modification path further comprises:
   means for receiving said first output with a first positive amplifier; means for receiving said fourth output with a first negative amplifier;
   means for summing said first and fourth outputs with a first summing circuit;
   means for receiving an output of said first summing circuit with a first additional amplifier; and
   means for outputting a first modified output signal with said first additional amplifier.

44. The system of claim 43 wherein said means for sending said second and third outputs through a second modification path further comprises:
   means for receiving said second output with a second positive amplifier;
   means for receiving said third output with a second negative amplifier;
   means for summing said second and third outputs with a second summing circuit;
   means for receiving an output of said second summing circuit with a second additional amplifier; and
   means for outputting a second modified output signal with said second additional amplifier.

45. The system of claim 44 wherein said means for altering one or more outputs of said array of photodetectors with a tracking servo further comprises:
   means for receiving said first and second modified output signals with said tracking servo; and
   means for performing a phase gain compensation process on said first and second modified output signals.

46. The system of claim 45 wherein said means for altering one or more outputs of said array of photodetectors with an angular position driver further comprises:
   means for producing a POSsine and a POScosine signal with said angular position driver;
   means for combining said first modified output signal with said POSsine signal in a third amplifier to produce said first drive signal; and
   means for combining said second modified output signal with said POScosine signal in a fourth amplifier to produce said second drive signal.

47. The system of claim 46 wherein said POSsine and said POScosine signals are generated by a radial ramp.

48. The system of claim 46 wherein said POSsine and said POScosine signals are generated by an oscillator.

49. The system of claim 47 wherein said optical pickup unit comprises an objective lens having a first, a second, and a third degree of freedom, further comprising means for controlling said first and second degrees of freedom with first and second lens driver coils.

50. The system of claim 49, further comprising: means for providing input to said first lens driver coil with said first drive signal; and means for providing input to said second lens driver coil with said second drive signal.

51. The system of claim 41 wherein said medium is an optically recordable medium.

52. The system of claim 51 wherein said medium is a three dimensional medium.

53. The system of claim 52 wherein said three dimensional medium is a holographic medium.

* * * * *